Feb. 20, 1940.                H. GALLUSSER                    2,191,377
                    METHOD OF REDUCTION OF OXIDES
                       Filed Dec. 7, 1937        3 Sheets-Sheet 1
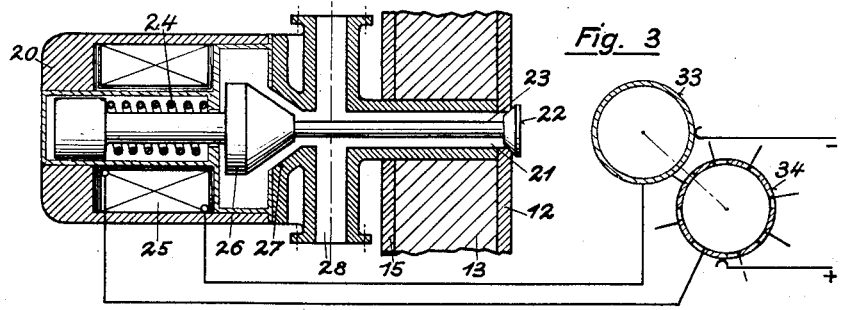
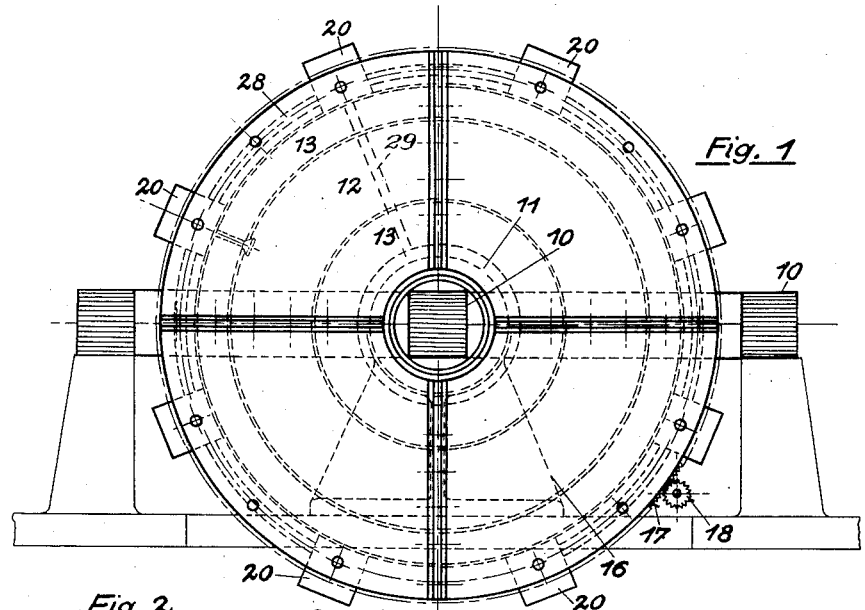
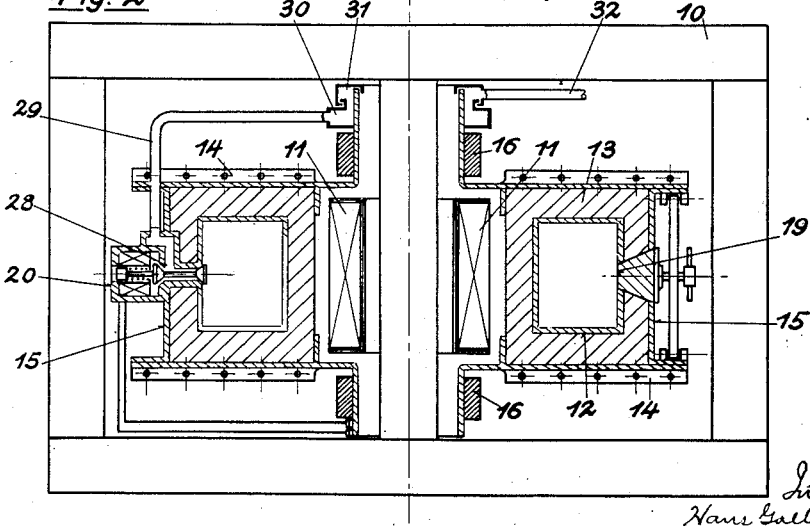

Feb. 20, 1940.                H. GALLUSSER                2,191,377
                    METHOD OF REDUCTION OF OXIDES
                Filed Dec. 7, 1937            3 Sheets-Sheet 2
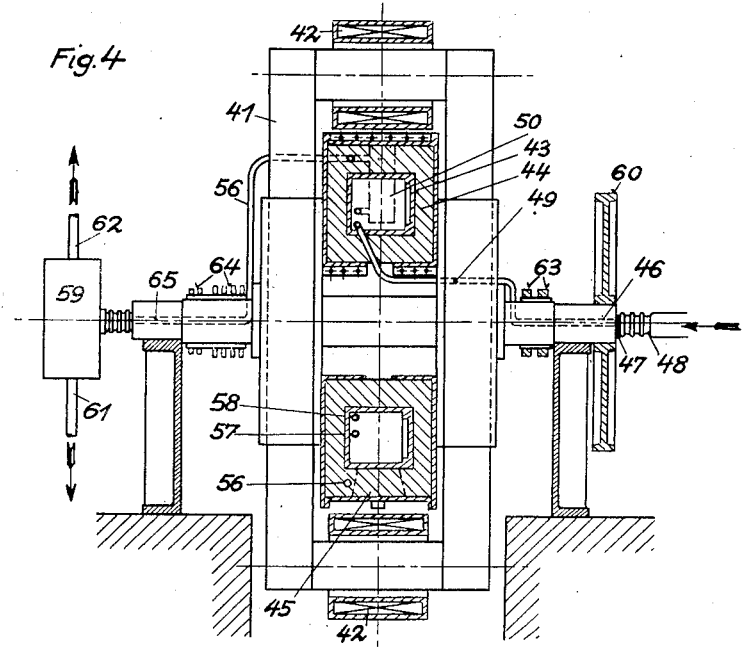
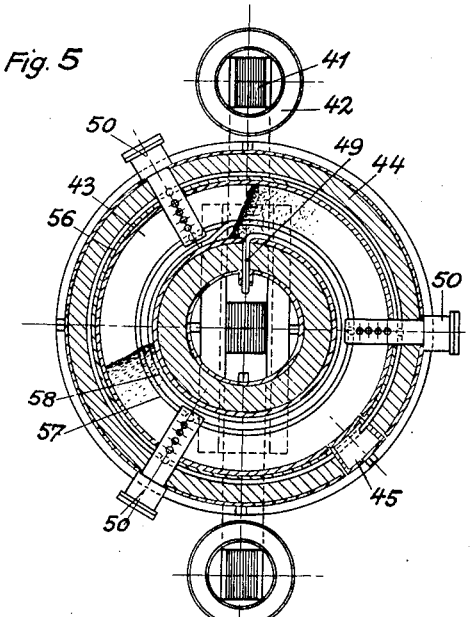
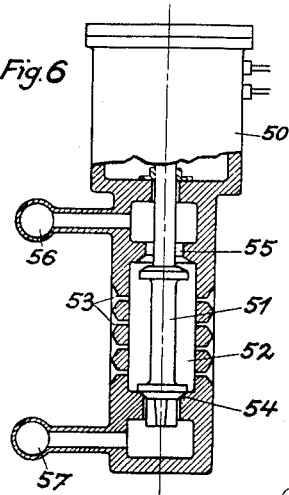

Feb. 20, 1940. H. GALLUSSER 2,191,377
METHOD OF REDUCTION OF OXIDES
Filed Dec. 7, 1937 3 Sheets-Sheet 3

Inventor
Hans Gallusser
By Sommers & Young attys

Patented Feb. 20, 1940

2,191,377

UNITED STATES PATENT OFFICE 2,191,377

METHOD OF REDUCTION OF OXIDES

Hans Gallusser, Geneva, Switzerland

Application December 7, 1937, Serial No. 178,593
In Germany December 16, 1936

5 Claims. (Cl. 75—10)

Hitherto iron oxides, such as for example, iron ores, have been generally reduced and melted with coke in smelting furnaces. The smelting heat in smelting furnaces has also been produced by electrical energy and the smelting furnace has been supplied only with so much coke as is necessary for the reduction of the iron oxide. In this manner there was produced a reduction of the consumption of coke by about one-half. In spite of this there are countries in which iron ore is available but no coal deposits and these countries have to relay upon the import of coal from abroad which renders the treatment of iron ores more or less difficult.

Rotary, electrically heated, reducing furnaces are known, in which the heating current is passed through the ore mixed with coal. As, however, the resistance of the ores differs considerably before and after reduction, this heating cannot be regarded as satisfactory. Further the iron sponge formed between the electrodes may form bridges for the current, in which the iron sponge commences to sinter, in consequence of the considerable heating, which leads to disturbances in operation.

Endeavors have also been made to carry out the reduction of iron ores by means of hydrogen. These attempts have, however, failed because it was not possible hitherto to cause the hydrogen to pass completely through the mass of ore to be reduced.

The method according to the present invention enables the above mentioned disadvantages to be eliminated.

According to the present process the ore, together with a reducing agent, is heated in a closed rotary vessel by means of an induced current produced by a transformer in the wall of the vessel.

In comparison with the known reduction methods, the present method has the substantial advantage that the temperature can be maintained accurately at the value necessary for the reduction and, as the ore itself is not utilised for the electrical heating, danger of sintering is entirely excluded.

The accompanying drawings show by way of example and diagrammatically a number of forms of construction of devices which illustrate the method according to the present invention.

In the drawings

Fig. 1 is an elevation of a rotary reduction furnace, heated by an induced current, in which a reducing agent, for example, coal is used.

Fig. 2 is a sectional plan.

Fig. 3 shows a detail on a larger scale.

Fig. 4 is a sectional view in a plane at right angles to the axis of a furnace, in which hydrogen is used as the reducing agent.

Fig. 5 is a corresponding sectional view at right angles to the axis of rotation.

Fig. 6 shows a valve on a larger scale.

Figure 7:
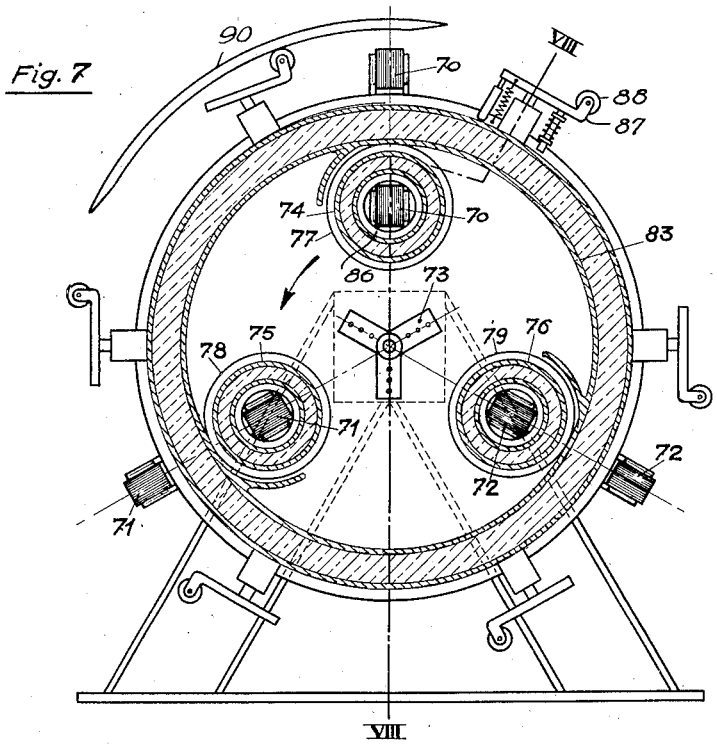
Figs. 7 and 8 illustrate a form of construction for three-phase current, Fig. 8 being a sectional view on the line VIII—VIII of Fig. 7.

In Figs. 1 and 2, numeral 10 designates the magnet frame of a transformer and 11 the primary winding thereof. The secondary winding is formed by the annular closed metal vessel 12, which is protected against heat losses towards the outside by the insulating mass 13. The whole is surrounded by a casing formed by end plates 14 and an external ring 15. Both the end plates 14 and the ring 15 must naturally be divided into sections and relatively insulated as otherwise they would constitute a short-circuited winding and would consequently also be heated by the induced current.

The container thus formed is rotatably mounted in bearings 16 and is driven by means of a toothed flange 17, provided at the periphery thereof and a toothed wheel 18 (see Fig. 1) meshing therewith.

The vessel 12 is provided with a charging opening 19 and is also provided at its periphery with valves 22, located at uniformly spaced intervals, for conducting away the gases generated during the reduction.

The valves 22 are controlled electrically and for this purpose are constructed as shown in Fig. 3.

Through the wall of the container 12, the insulating mass 13 and the annular jacket 15 extends a passage 21 of which the end in the container 12 is closed by a valve body 22. The spindle 23 of valve 22 is subjected on the one hand to the action of a spring 24 which presses the valve body 22 against the end of passage opening 21 which serves as a valve seat, and on the other hand to the action of an electromagnet 25 which, when energised, moves the valve body 22 away from the end of opening 21, that is, the valve seat.

In order to protect the part of the valve casing 20, in which the electromagnet is located, from the hot exhaust gases, the valve spindle 23 is provided with a second valve body 26 which, when the valve 22 is opened, bears against a conical seat 27 formed on the valve casing 20 and thus completely shuts off the outer valve casing from the passage 21.

Gases escaping from the passage 21 pass into a collecting passage 28 and from here are conducted by a pipe 29 into a two-part container, of which one part 30 rotates with the furnace, whilst the other part 31 remains stationary. From the latter the gases are conducted by a pipe 32.

The collecting passage 28 naturally does not form a closed ring, but, as shown in Fig. 1, is interrupted or omitted between the two valve casings 20 located in the lowermost position. In this position the pipe 29 is located at the middle of the upper half of the vessel 12.

In order that the valves 22 will open only when they are above a horizontal plane passing through the axis of rotation, so as to avoid clogging by the ore which is introduced, they are actuated electrically as shown in Fig. 3.

On the rotary shaft of the furnace there are provided two contact rings 33 and 34, to which the electromagnets 25 are connected. The contact ring 34 is subdivided in accordance with the number of valves 22. Against the two rings 33 and 34 there bear brushes 35 which are connected to a source of current, and the position of the brush which is in contact with the ring 34 is so selected that the electromagnets 25 are only energised when they are located above the horizontal plane passing through the axis of rotation so that no ore can enter the passages 21.

It will be obvious that the valves 22 may also be actuated mechanically by causing them to open when in the desired position, for example by suitable stops.

The method of operation of this apparatus is as follows:

After a sufficient quantity of ore, with the admixture necessary for the reduction, has been charged into the container 12 through the charging opening 19, so as to fill the same to about half, current is passed through the primary winding 11 and a slow rotary movement is imparted to the container. The walls of the latter are heated by the induced current produced therein and as they constitute a comparatively large surface relatively to the mass of ore, the transmission of heat takes place very rapidly. This transmission of heat takes place practically only in the interior of the container 12 as it is thoroughly protected towards the outside in all directions by the surrounding insulating mass 13. Only inappreciable heat losses can consequently occur.

As the mass of ore in consequence of the rotary movement is continuously stirred up and thus always fresh parts come into contact with the heated walls the heat is distributed very uniformly throughout the mass.

The ore only comes into contact with the walls of the vessel 12 and consequently cannot acquire a temperature different from that of the vessel as there is no possibility for a higher temperature to be imparted thereto from any point. The possibility of heating and sintering associated therewith are thus entirely excluded.

By varying the current supplied to the primary winding 11 it is possible to vary the temperature in the vessel 12. It is thus possible to heat this vessel 12 just to the exact reduction temperature.

As the period of time necessary in connection with each particular ore for carrying out the reduction can be determined easily, unnecessary consumption of current is avoided.

The gases resulting from the reduction are conducted away from the upper empty part of the vessel 12, as above described, through the valves 22 and the passages 28 and 29, for the purpose of further use.

In Figs. 4 and 5, numeral 41 indicates a rotatably mounted frame of a transformer, and numeral 42 designates the primary winding thereof located on the two limbs. The secondary winding is formed by an annular metal casing 43 which is protected towards the outside by heat insulating material 44. This annular vessel 43 is provided with a closable opening 45 through which an ore, for example iron ore, is introduced and through which the contents can be removed from the vessel 43. The right hand side of the rotary axis of the vessel is provided with a passage 46 through which hydrogen is supplied from the outside. The supply of gas is effected by means of a ring 47 which is pressed against the rotating shaft by means of a resilient intermediate member 48. The passage 46 in the shaft is connected to a pipe 49 leading into the vessel 43 and to three valves 50, which allow the gas to flow into the interior of the vessel 43. The three valves 50 are connected together by an annular pipe 57 into which leads the pipe 49, after it has described a complete ring 58 in the vessel 43. In this part 58 of the supply pipe the hydrogen supplied is pre-heated before being introduced into the mass of ore.

The valves 50 are actuated electrically and are provided with two end positions. When a current flows through the electromagnet, actuating each respective valve, the valve body 51 thereof is raised and the inner chamber 52 of the valve, provided with the outflow nozzles 53, communicates directly with the above described gas pipe 57. When the current is interrupted the valve body 51 is depressed by a spring located in the electromagnet and not shown in the drawing, until it comes to rest on the seat 54, whereby the supply of gas is cut off. At the same time the valve body 51 opens at the top a passage 55 so that the gases in the furnace can flow into the condenser 59 through the pipe 56 which is connected to the passage 65 at the left hand end of the shaft. The electrical actuation is effected in such a manner that the gas supply is opened when the valves are covered by the mass of ore to be reduced so that the gas penetrates this mass. For each valve 50 the gas supply is closed and the gas outlet opened as soon as it has passed out of the mass of ore as a result of the rotary movement. The outlet nozzles 53 are arranged laterally and shaped in the form of funnels so that the ore dust, which is continuously in movement, cannot fall thereon and lead to clogging. The nozzles 53 are preferably located in surfaces which are at least approximately parallel to the plane of rotation of the vessel 43.

The method of operation of this second form of construction is as follows:—

The vessel 43 is partially charged with ore so that it is not filled completely, in order to obtain an effective and continuous mixing by the rotary movement. The primary winding 42 of the transformer 41 is then subjected to electrical potential and at the same time the furnace with the transformer is rotated slowly, for example, by means of the belt pulley 60. The magnetic flux which passes through the central column of the transformer produces in the vessel 43 a short-circuit current which heats this vessel and thus also the ore. When the temperature has reached a predetermined value hydrogen is supplied to the right hand end of the furnace through the pipe 49. Above a predetermined temperature the hydrogen possesses such great affinity relatively to the oxygen that it combines with the oxygen of the ore, for example, iron ore, and is burnt to water vapor whilst the pure iron remains. The resulting water vapor collects in the upper empty part of the furnace and is conducted away through the valves 43 and the pipe 56. As the water vapor is always mixed with hydrogen these exhaust gases are not allowed to escape into the open, but they are conducted into a condenser where the vapor, as a result of the cooling, is deposited in the form of water and the remaining gaseous hydrogen is returned into the circuit. From the condenser 59 the condensed water is conducted away through a pipe 61 and the remaining water vapor is conducted away for the purpose of further use through the pipe 62.

In Fig. 4 there are provided on the right hand side the slip rings 63 for the supply of current to the transformer. At the left hand side are provided the slip rings 64 for the actuation of the valves and for measuring the temperature in the interior of the furnace by means of a thermal element. The external parts of the furnace must naturally be subdivided and relatively insulated so as to prevent the production of short-circuit currents therein.

In the description there has been described for the sake of simplicity a single phase transformer. It will, however, be clearly understood that the method may also be applied to polyphase furnaces as will be described hereinafter with reference to one example.

For pre-heating the hydrogen from the pipe 49 it is naturally also possible to use the hot exhaust gases by passing the supply pipe through a portion of the outflow pipe on the counter-current principle.

It is also possible to provide more than three valves 50 and these may be actuated mechanically, and instead of controlling the inflow of the hydrogen and the outflow of the water vapor by the same valve body, a separate valve may be provided for each of these operations. For the pipe 58 in the vessel 43 it is also possible to substitute a number of coils.

The primary winding 42 of the transformer may naturally also be located on the central column, but this has the disadvantage that the winding may be heated too strongly.

Figure 8:
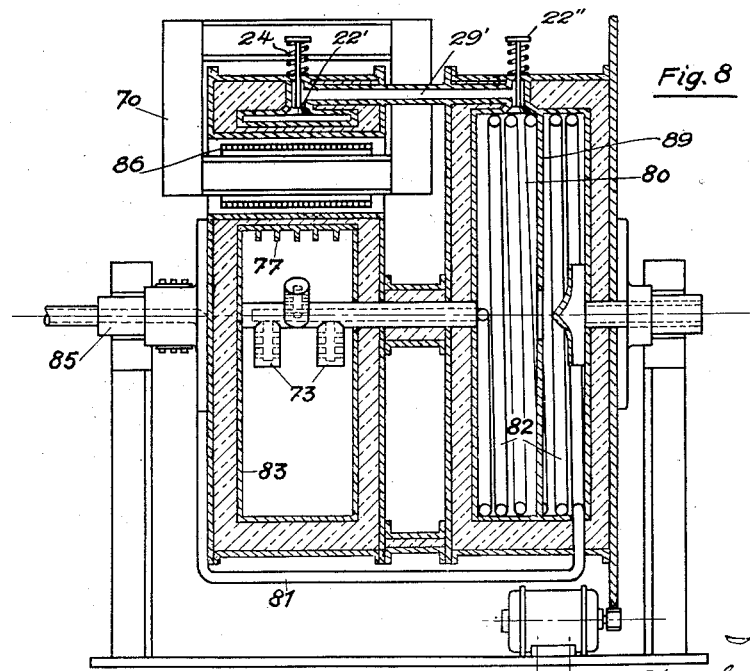

The induction furnace according to the present invention may also be arranged for three-phase current. For this purpose three single-phase transformers 70, 71 and 72 having primary windings 86 are mounted in the furnace with an annular metal casing 83, forming the secondary winding, as shown in Figs. 7 and 8.

In this case the gas inlet valves 73 are located at the center of the furnace. In order to render the heat transmission to the ore as intensive as possible, the inner cylinders 74, 75 and 76 are provided with rings 77, 78 and 79 whereby the heat transmitting surface is considerably increased.

The gas in the furnace is discharged through valves 22', which are normally spring pressed closed by springs 24'. The valves have actuating levers 87 and rollers 88 adapted to be engaged by cam guide 90 when the discharge valves are at the upper part of the rotation to open the valves and allow discharge of the gases into pipes 29'. The discharge of the gas from the pipes 29' is controlled by similarly controlled valves 22.

As the gases which are discharged from the furnace always entrain a certain amount of ore dust, whereby the gas pipes are easily clogged, there is associated with the furnace a dust chamber 80 with multiple subdivision. In this chamber the ore particles which are entrained are deposited so that the gases leaving the furnace are as free from dust as possible. When the furnace, after the completion of the reduction, is emptied it is also necessary at the same time to remove the ore dust from the dust chamber.

The dust chamber which is heated by the outflowing gases may also be utilized for the preliminary heating of the hydrogen to be supplied. For this purpose the hydrogen, after being supplied to the hollow shaft 85, is conducted through a separate pipe 81 to coil 82 which passes through division partition 89 and into the dust chamber from which it passes pre-heated through the gas valve 73 beneath the surface of the mass of ore being treated.

It will be understood that also in connection with the two examples of construction first described, ribs may be provided on the inner wall of the vessel so as to improve the heat transmission. It is also possible to provide more than three single-phase transformers, for example six thereof.

It will also be understood that according to the present method it is possible to treat not only iron oxides but in general metal oxides or also oxides of metalloids.

The apparatus disclosed in this application is claimed in my divisional application 281,046, filed June 24, 1939.

I claim:

1. A method for the reduction of oxides, such as oxides of metals or oxides of metalloids, comprising heating the ore together with a reducing agent in a substantially horizontal closed rotary metallic vessel to the reduction temperature by an electric current induced in a wall of the vessel by a primary transformer winding, and retarding flow of heat from the wall of said vessel in all directions except toward the ore being treated.

2. A method according to claim 1, and continuously mixing the ore with its reducing agent during the heating in the vessel itself by rotating the vessel and ore.

3. A method according to claim 1, wherein the reducing agent is gaseous, and continuously mixing said agent with the ore during heating in the vessel itself by the rotation thereof, said vessel being only partly filled with ore so as to permit the continuous mixing of the ore and reducing agent, said reducing agent being supplied to the ore itself.

4. A method according to claim 1, wherein the reducing agent is gaseous hydrogen and is continuously mixed with said ore during heating in the vessel itself by rotating the vessel and ore, the said hydrogen combining with the oxygen of the ore so as to form water vapor, removing the water vapor thus formed, and subsequently condensing the water vapor for recovering any free hydrogen still present which is adapted to be re-used.

5. A method according to claim 1, wherein the reducing agent is hydrogen gas and is continuously mixed with said ore during heating in the vessel itself by the rotation thereof of said vessel, preheating said hydrogen before introducing it into the ore, the said hydrogen combining with the oxygen of the ore so as to form water vapor, removing the water vapor thus formed, and subsequently condensing the water vapor for recovering any free hydrogen still present which is adapted to be re-used.

HANS GALLUSSER.